(12) United States Patent
Brunnberg et al.

(10) Patent No.: US 9,011,219 B2
(45) Date of Patent: Apr. 21, 2015

(54) SYSTEM AND METHOD FOR AIR-CONDITIONING AN AIRCRAFT CABIN

(75) Inventors: Holger Brunnberg, Hamburg (DE); Dariusz Krakowski, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 1120 days.

(21) Appl. No.: 13/056,215

(22) PCT Filed: Jul. 23, 2009

(86) PCT No.: PCT/EP2009/005361
§ 371 (c)(1),
(2), (4) Date: Apr. 5, 2011

(87) PCT Pub. No.: WO2010/012415
PCT Pub. Date: Feb. 4, 2010

(65) Prior Publication Data
US 2011/0212678 A1    Sep. 1, 2011

Related U.S. Application Data

(60) Provisional application No. 61/083,976, filed on Jul. 28, 2008.

(30) Foreign Application Priority Data

Jul. 28, 2008   (DE) .................. 10 2008 035 123

(51) Int. Cl.
*B64D 13/00* (2006.01)
*B64D 13/02* (2006.01)
(Continued)

(52) U.S. Cl.
CPC ......... *B64D 13/00* (2013.01); *B64C 2001/0027* (2013.01); *B64D 2013/0688* (2013.01); *Y02T 50/56* (2013.01)

(58) Field of Classification Search
USPC ................... 454/76, 71, 74, 73; 62/86, 412
IPC .............. B64D 13/08,13/00, 2013/003, 3/0085, B64D 1/008; F25D 9/00, 17/042, 3/04
See application file for complete search history.

(56) References Cited

U.S. PATENT DOCUMENTS 4,262,495 A * 4/1981 Gupta et al. .................... 62/402
5,545,084 A * 8/1996 Fischer et al. .................. 454/76
(Continued)

FOREIGN PATENT DOCUMENTS

| CN | 1902090 | 1/2007 |
|---|---|---|
| CN | 101155728 | 4/2008 |

(Continued)

OTHER PUBLICATIONS

European Patent Office, International Search Report, PCT Forms PCT/ISA/210 (3 pgs.) and PCT/ISA/237 (5 pgs).
(Continued)

*Primary Examiner* — Steven B McAllister
*Assistant Examiner* — Helena Kosanovic
(74) *Attorney, Agent, or Firm* — Wood, Herron & Evans, LLP

(57) ABSTRACT

A system for air-conditioning an aircraft cabin includes an air conditioning unit connected to a central mixer, a first recirculation system designed to remove exhaust air from a first aircraft cabin region and connected to the central mixer, and a second recirculation system designed to remove exhaust air from a second aircraft cabin region and connected to a local mixer. A control device is designed to control the second recirculation system to reduce an air volume flow being removed from the second aircraft cabin region when shifting from a first operating state (e.g., normal operation) to a second operating state (e.g., defined operating situations such as when quick cooling is desired). The air volume being removed from the first aircraft cabin region may be increased accordingly in the second operating state.

10 Claims, 1 Drawing Sheet

(51) Int. Cl.
  *F25B 9/00* (2006.01)
  *F25D 17/06* (2006.01)
  *B64C 1/00* (2006.01)
  *B64D 13/06* (2006.01)

(56) References Cited

U.S. PATENT DOCUMENTS

2004/0231350 A1 11/2004 Kline et al.
2006/0219842 A1 10/2006 Shell et al.
2007/0111650 A1 5/2007 Lerche

FOREIGN PATENT DOCUMENTS

DE 4425871 2/1996
EP 0693423 1/1996
EP 1188666 3/2002
WO 2008144295 11/2008

OTHER PUBLICATIONS

Chinese Patent Office, Office Action, Dec. 5, 2012 (6 pages), English Summary of Office Action (1 page).

* cited by examiner

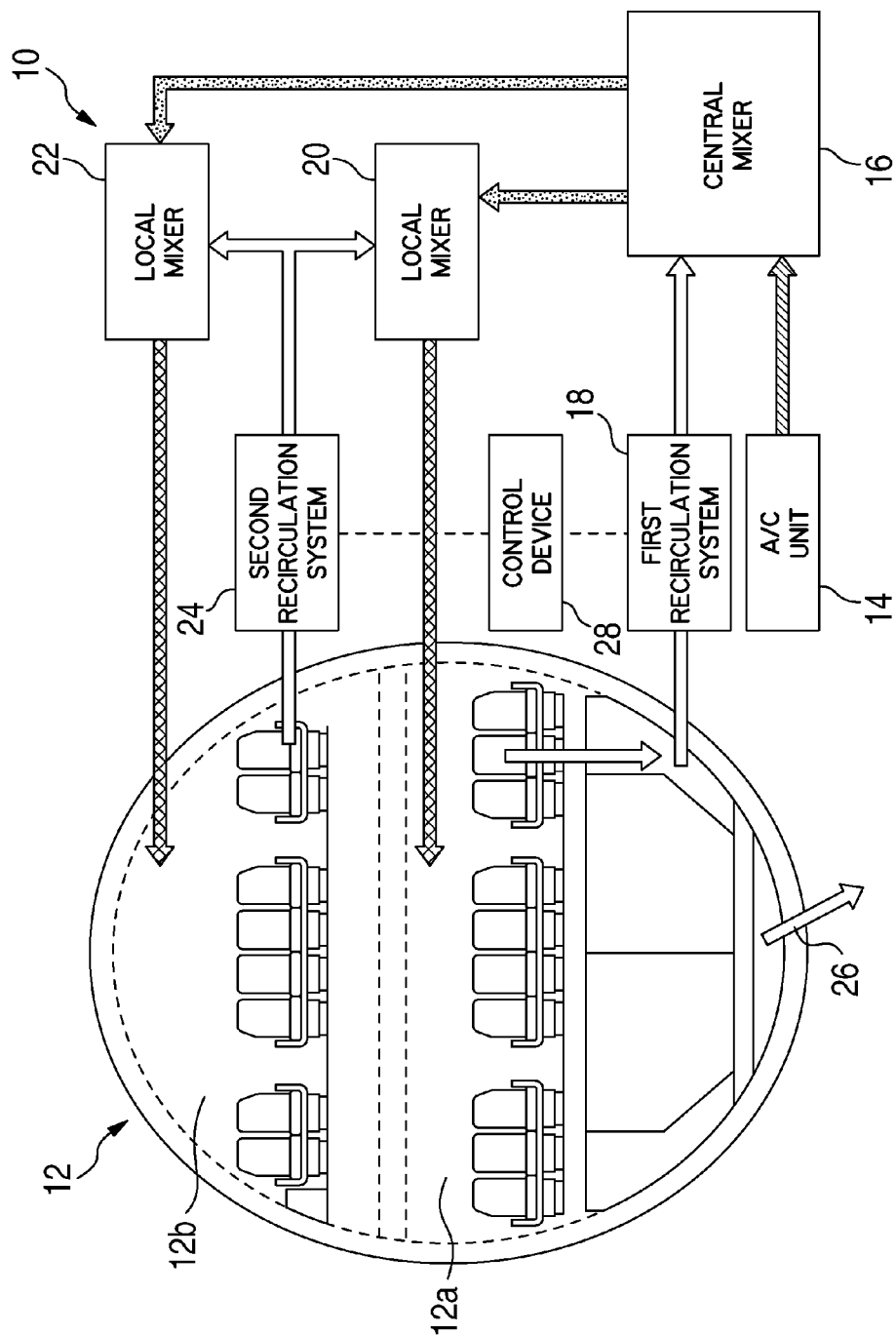

SYSTEM AND METHOD FOR AIR-CONDITIONING AN AIRCRAFT CABIN

CROSS-REFERENCE TO RELATED APPLICATIONS

This application claims priority, under Section 371, to PCT Application No. PCT/EP2009/005361, filed on Jul. 23, 2009, which claims priority to German Application No. 10 2008 035 123.7 and also to U.S. Provisional Application No. 61/083,976, both filed on Jul. 28, 2008.

TECHNICAL FIELD

The present invention relates to a system and a method for air-conditioning an aircraft cabin.

BACKGROUND

The cabin of a modern passenger aircraft is air-conditioned usually both when the aircraft is flying and is on the ground by means of the aircraft's own air conditioning system. The aircraft air conditioning system is supplied with bleed air which is taken from the engine compressors or auxiliary power unit compressors and cooled to a desired low temperature in the air conditioning units, the so-called air conditioning packs of the aircraft air conditioning system. The air cooled in the air conditioning packs of the aircraft air conditioning system is led into a mixer where it is mixed with recirculation air sucked from the aircraft cabin. The mixed air produced in the mixer and composed of cold fresh air provided by the air conditioning packs and of recirculation air sucked from the aircraft cabin is finally led into the aircraft cabin for air-conditioning of the aircraft cabin In wide-body aircraft, in particular in wide-body aircraft having two passenger decks extending over the entire length of the aircraft, an air conditioning system described, for example, in DE 44 25 871 C1 and comprising two recirculation systems for sucking exhaust air from the aircraft cabin is used at present. A low-pressure recirculation system extracts air from an upper deck region of the cabin, while a high-pressure recirculation system serves to extract air from a middle deck region of the cabin. The recirculation air removed from the middle deck region of the cabin by the high-pressure recirculation system is blown into a central mixer of the aircraft air conditioning system. In contrast, the air sucked from the upper deck region by the low-pressure recirculation system is supplied to local mixers which are fed with premixed air by the central mixer, i.e. an air mixture composed of cold fresh air provided by the air conditioning packs and recirculation air from the middle deck region of the cabin. The air mixture, produced in the local mixers, composed of premixed air from the central mixer and recirculation air from the upper deck region of the cabin is finally used for air-conditioning the aircraft cabin. In particular, air is led into the middle deck region of the cabin from a local mixer arranged in the region of the middle deck, while air is blown into the upper deck region of the cabin from a local mixer arranged in the region of the upper deck.

An air conditioning system equipped with two recirculation systems is designed so that both recirculation systems must always provide a defined minimum air flow in order to ensure sufficient ventilation of the aircraft cabin. In the operation of the aircraft air conditioning system, therefore, it is not possible to switch off one recirculation system or both recirculation systems. In the operation of the recirculation systems, however, the waste heat produced by the fans of the recirculation systems gives rise to additional heat loads. The cooling energy required for cooling the recirculation fans has to be provided by the air conditioning system, so that the operation of the recirculation systems reduces the cooling capacity available for the cooling of the aircraft cabin.

In particular when the aircraft is on the ground on hot days, the additional heat input of the recirculation systems can significantly increase the time required for cooling the aircraft cabin to a desired temperature. The air conditioning system then requires a longer run-up period until the cabin is sufficiently cooled and passenger boarding can start. As a result, the turnaround of the aircraft at the airport is slowed down. Since the air conditioning system is supplied with bleed air from the auxiliary power unit compressors in this operating phase, the increased run-up period of the air conditioning system also gives rise to increased fuel costs. Finally, the operating time of the auxiliary power unit is increased, which may lead to higher maintenance costs.

The invention is directed at the object of specifying a system and a method for air-conditioning an aircraft cabin which allow a shortening of the time required for cooling the aircraft cabin when the aircraft is on the ground.

SUMMARY

This object is achieved by a system for air-conditioning an aircraft cabin having the features described below and a method for air-conditioning an aircraft cabin having the features described below.

A system for air-conditioning an aircraft cabin according to the invention comprises an air conditioning unit connected to a central mixer in order to supply the central mixer with air at a desired low temperature. The air conditioning unit can be supplied with bleed air at an elevated pressure from the engine compressors or the auxiliary power unit compressors. A first recirculation system of the air conditioning system according to the invention is designed to remove exhaust air from a first aircraft cabin region. The first recirculation system can comprise a plurality of air outlet openings which are arranged in the first aircraft cabin region and are formed, for example, in a side-wall region near the floor or in a floor region of the first aircraft cabin region. The first recirculation system of the air conditioning system according to the invention is furthermore connected to the central mixer in order to lead the exhaust air removed from the first aircraft cabin region into the central mixer.

Furthermore, the air conditioning system according to the invention comprises a second recirculation system which is designed to remove exhaust air from a second aircraft cabin region. Similarly to the first recirculation system, the second recirculation system can also comprise a plurality of air outlet openings which are formed in a side-wall region near the floor or in a floor region of the second aircraft cabin region. In a wide-body aircraft having two passenger decks, the first aircraft cabin region can be, for example, a middle deck region of the aircraft cabin. The second aircraft cabin region can then be, for example, an upper deck region of the cabin. The second recirculation system is connected to a local mixer in order to lead the exhaust air from the second aircraft cabin region into the local mixer. Depending on the design of the system, the air conditioning system according to the invention can also comprise a plurality of local mixers. A system for air-conditioning the cabin of a wide-body aircraft having two passenger decks can comprise, for example, a first local mixer arranged in the region of the middle deck and a second local mixer arranged in the region of the upper deck.

The local mixer is connected to the central mixer. The mixed air produced in the central mixer and composed of cold fresh air provided by the air conditioning unit and recirculation air from the first aircraft cabin region can thus be led from the central mixer into the local mixer. In the local mixer, the mixed air supplied from the central mixer is finally also mixed with the recirculation air removed from the second aircraft cabin region, before the mixed air is led from the local mixer into the aircraft cabin. For example, mixed air from a first local mixer arranged in the region of the middle deck can be used to air-condition the middle deck region of the aircraft cabin, while mixed air from a local mixer arranged in the region of an upper deck can be employed to air-condition the upper deck region of the aircraft cabin.

The system for air-conditioning an aircraft cabin according to the invention furthermore comprises a control device which is designed to control the second recirculation system in the normal operation (also referred to as a "first operating state" in places below) of the air conditioning system in such a way that the second recirculation system removes a predefined air volume flow from the second aircraft cabin region. The control device can be, for example, an electronic control device. Preferably, the air volume flow removed from the second aircraft cabin region by the second recirculation system in the normal operation of the air conditioning system is approximately equal to the air volume flow removed from the first aircraft cabin region by the first recirculation system.

The control device of the system for air-conditioning an aircraft cabin according to the invention is also designed to control the second recirculation system in defined operating situations (also referred to as a "second operating state" in places below) of the air conditioning system in such a way that the air volume flow removed from the second aircraft cabin region by the second recirculation system is reduced in relation to the predefined air volume flow removed from the second aircraft cabin region by the second recirculation system in the normal operation of the air conditioning system. In other words, the control device is designed to reduce the capacity of the second recirculation system in defined operating situations of the air conditioning system without, however, completely stopping the operation of the second recirculation system.

The idea underlying the present invention is based on the realization that in particular the additional heat load which arises owing to the waste heat produced by the fans of the second recirculation system has an adverse effect on the air conditioning capacity of the entire system. The cause of this effect is considered to be the fact that the exhaust air removed from the second aircraft cabin region, which air is additionally heated by the waste heat of the components of the second recirculation system, is supplied into the local mixer where it is not mixed with cold fresh air produced by the air conditioning unit, but merely with mixed air, already premixed and consequently preheated, from the central mixer before it is led back into the second aircraft cabin region.

As a result of the reduction of the air volume flow removed from the second aircraft cabin region by the second recirculation system, the amount of waste heat produced by the fans of the second recirculation system can be reduced. Moreover, less heat exhaust air from the second aircraft cabin region is supplied to the local mixer. This allows markedly more efficient utilization of the cold fresh air produced by the air conditioning unit. Operating situations in which a reduction of the capacity of the second recirculation system has an advantageous effect are, for example, situations in which quick cooling of the aircraft cabin is desired or required.

The air conditioning system according to the invention thus allows rapid cooling of the aircraft cabin also when the aircraft is on the ground on hot days. As a result, passenger boarding can start more quickly and thus the turnaround time of the aircraft at the airport can be shortened. Moreover, the operating times of the auxiliary power unit for supplying the air conditioning unit with bleed air are reduced, with the result that fuel savings and lower maintenance costs can be achieved. A further advantage of the air conditioning system according to the invention consists in the fact that it is weight-neutral, i.e. optimized utilization of the cooling capacity of the air conditioning unit is made possible without additional weight.

The control device of the air conditioning system according to the invention is preferably designed to evaluate at least one predefined parameter and to control the second recirculation system in dependence on the evaluation of the at least one predefined parameter. In particular, the evaluation of the at least one predetermined parameter serves to determine the utilization state of the air conditioning unit and components associated with the air conditioning unit. Furthermore, the evaluation of the at least one predetermined parameter can serve to detect the presence of an operating situation in which a reduction of the additional heat input caused by the second recirculation system is desired or required. The control device can control the second recirculation system in such a way that the air volume flow removed from the second aircraft cabin region by the second recirculation system is reduced in relation to the predefined air volume flow removed from the second aircraft cabin region by the second recirculation system in the normal operation of the air conditioning system only if the air conditioning unit is not yet fully utilized, i.e. the air conditioning unit is still in an operating state in which it can still provide additional cooling capacity. As a result of such a control of the air conditioning system according to the invention, overloading of the air conditioning unit and components associated with the air conditioning unit is reliably prevented.

The parameter(s) evaluated by the control device can be, for example, a cabin temperature actual value for the first aircraft cabin region, a cabin temperature set value for the first aircraft cabin region, a cabin temperature actual value for the second aircraft cabin region, a cabin temperature set value for the second aircraft cabin region, an outside temperature actual value, a temperature actual value of the air provided by the air conditioning unit, a temperature set value of the air provided by the air conditioning unit, a temperature actual value of the air provided by the central mixer, a temperature set value of the air provided by the central mixer, a temperature actual value of the air provided by the local mixer and/or a temperature set value of the air provided by the local mixer. Furthermore, the control device of the air conditioning system according to the invention can be designed to evaluate various air volume flow actual and/or set values, for example, of the exhaust air removed from the first aircraft cabin region, of the exhaust air removed from the second aircraft cabin region, of the mixed air supplied to the local mixer by the central mixer and/or of the air conditioning air blown into the aircraft cabin by the local mixer.

Furthermore, the control device of the system for air-conditioning an aircraft cabin according to the invention can be designed to control the first recirculation system in such a way that the air volume flow removed from the first aircraft cabin region by the first recirculation system is increased in relation to a predefined air volume flow removed from the first aircraft cabin region by the first recirculation system in the normal operation of the air conditioning system. As a result of the increase of the exhaust air flow to be removed from the first aircraft cabin region, the quantity of recirculation air supplied to the central mixer is increased and the loss of recirculation air due to the reduction of the capacity of the second recirculation system is at least partly compensated. Although the amount of waste heat produced by the first recirculation system is increased by the increase of the capacity of the first recirculation system, the additional heat input produced by the first recirculation system has a very much smaller influence on the cooling capacity of the entire air conditioning system than the additional heat input produced by the second recirculation system in operation, since the air heated by the waste heat of the fans of the first recirculation system is led from the first aircraft cabin region directly into the central mixer and mixed with cold fresh air there. The cooling of the air in the aircraft cabin is therefore hardly slowed down by an increase of the capacity of the first recirculation system.

In a particularly preferred embodiment of the system for air-conditioning an aircraft cabin according to the invention, the control device is designed to control the first recirculation system in such a way that the air volume flow removed from the first aircraft cabin region by the first recirculation system is increased in relation to the predefined air volume flow removed from the first aircraft cabin region by the first recirculation system in the normal operation of the air conditioning system by an amount which is equal to the amount by which the air volume flow removed from the second aircraft cabin region by the second recirculation system is reduced in relation to the predefined air volume flow removed from the second aircraft cabin region by the second recirculation system in the normal operation of the air conditioning system. In other words, the loss of recirculation air resulting from the reduction of the capacity of the second recirculation system is preferably completely compensated by additional recirculation air which is additionally sucked from the first aircraft cabin region by the first recirculation system owing to the increase in capacity of the first recirculation system. There is thus no reduction of the total recirculation air quantity, but merely a redistribution between the recirculation air quantity conveyed by the first recirculation system and the recirculation air quantity conveyed by the second recirculation system. As a result, a sufficiently high air exchange rate is ensured in the aircraft cabin in every operating state of the air conditioning system according to the invention.

In a method for air-conditioning an aircraft cabin according to the invention, air is produced at a desired low temperature by an air conditioning unit. The cold fresh air produced by the air conditioning unit is supplied into a central mixer. Exhaust air is removed from a first aircraft cabin region by a first recirculation system. The air removed from the first aircraft cabin region by the first recirculation system is led into the central mixer. Exhaust air is removed from a second aircraft cabin region by a second recirculation system. The air removed from the second aircraft cabin region by the second recirculation system is led into a local mixer. Mixed air from the central mixer is supplied to the local mixer. The second recirculation system is controlled by a control device, which can be, for example, in the form of an electronic control device, in the normal operation of the air conditioning system in such a way that the second recirculation system removes a predefined air volume flow from the second aircraft cabin region. In defined operating situations of the air conditioning system, the second recirculation system is controlled by the control device in such a way that the air volume flow removed from the second aircraft cabin region by the second recirculation system is reduced in relation to the air volume flow removed from the second aircraft cabin region by the second recirculation system in the normal operation of the air conditioning system.

Preferably, the control device evaluates at least one predefined parameter and controls the second recirculation system in dependence on the evaluation of the at least one predefined parameter.

For example, the control device evaluates a cabin temperature actual value for the first aircraft cabin region, a cabin temperature set value for the first aircraft cabin region, a cabin temperature actual value for the second aircraft cabin region, a cabin temperature set value for the second aircraft cabin region, an outside temperature actual value, a temperature actual value of the air provided by the air conditioning unit, a temperature set value of the air provided by the air conditioning unit, a temperature actual value of the air provided by the central mixer, a temperature set value of the air provided by the central mixer, a temperature actual value of the air provided by the local mixer and/or a temperature set value of the air provided by the local mixer and controls the second recirculation system in dependence on the evaluation of this/these parameter(s).

Preferably, the control device controls the first recirculation system in such a way that the air volume flow removed from the first aircraft cabin region by the first recirculation system is increased in relation to a predefined air volume flow removed from the first aircraft cabin region by the first recirculation system in the normal operation of the air conditioning system.

In a particularly preferred embodiment of the air conditioning method according to the invention, the control device controls the first recirculation system in such a way that the air volume removed from the first aircraft cabin region by the first recirculation system is increased in relation to the predefined air volume flow removed from the first aircraft cabin region by the first recirculation system in the normal operation of the air conditioning system by an amount which is equal to the amount by which the air volume flow removed from the second aircraft cabin region by the second recirculation system is reduced in relation to the predefined air volume flow removed from the second aircraft cabin region by the second recirculation system in the normal operation of the air conditioning system.

BRIEF DESCRIPTION OF THE DRAWINGS

A preferred embodiment of the invention will now be explained in more detail with the aid of the accompanying schematic FIGURE, which shows a schematic illustration of a system for air-conditioning an aircraft cabin according to the invention.

DETAILED DESCRIPTION

In the FIGURE, a system 10 for air-conditioning an aircraft cabin 12 is shown. The aircraft cabin 12 comprises two passenger decks and consequently a first aircraft cabin region 12a formed by a middle deck of the aircraft cabin 12 and a second aircraft cabin region 12b formed by an upper deck of the aircraft cabin 12. The air conditioning system 10 comprises an air conditioning unit 14 for producing cold fresh air which is supplied to a central mixer 16. In the central mixer 16, the cold fresh air produced by the air conditioning unit 14 is mixed with recirculation air which is removed from the first aircraft cabin region 12a, i.e. the middle deck of the aircraft cabin 12, by a first recirculation system 18. The exhaust air removal from the first aircraft cabin region 12a takes place through air outlet openings arranged in the floor region of the first aircraft cabin region.

The mixed air produced in the central mixer 16, i.e. the mixture of cold fresh air and recirculation air conveyed by the first recirculation system 18 from the first aircraft cabin region 12a is supplied to a first and a second local mixer 20, 22. The first local mixer 20 is arranged in the region of the middle deck of the aircraft cabin 12, while the second local mixer 22 is arranged in the region of the upper deck of the aircraft cabin 12. The local mixers 20, 22 are furthermore fed with recirculation air which is sucked from the second aircraft cabin region 12b by a second recirculation system 24. The recirculation air removal from the second aircraft cabin region 12b takes place through air outlet openings arranged in a side-wall region of the second aircraft cabin region 12b.

The air mixture produced in the first local mixer 20 is supplied to the first aircraft cabin region 12a as air conditioning air. Similarly, the air mixture produced in the second local mixer 22 is supplied to the second aircraft cabin region 12b as air conditioning air. Excess air from the aircraft cabin 12, i.e. air from the first and the second aircraft cabin region 12a, 12b which is not supplied to the central mixer 16 or the local mixers 20, 22 from recirculation air, is removed from the aircraft cabin 12 into the environment via an air outlet valve 26.

The first recirculation system 18 comprises fans, not illustrated specifically in the FIGURE, which produce waste heat in operation. Similarly, the second recirculation system 24 comprises fans, which are likewise not illustrated specifically in the FIGURE and produce waste heat in operation. The waste heat produced by the recirculation fans provides an additional heat input into the aircraft cabin 12 which has to be removed by the air conditioning system 10.

The air conveyed from the first aircraft cabin region 12a by the fans of the first recirculation system 18 and additionally heated by the waste heat of the fans of the first recirculation system 18 is mixed directly with cold fresh air in the central mixer 16. In contrast to this, the air conveyed from the second aircraft cabin region 12b by the second recirculation system 24 and additionally heated by the waste heat of the fans of the second recirculation system 24 is led into the local mixers 20, 22, from where it is led back into the aircraft cabin 12 again after mixing with air which is already premixed. While the additional heat input produced by the fans of the first recirculation system 18 has hardly any influence on the efficiency of the entire system 10, the cooling capacity of the entire system 10 is significantly impaired by the additional heat input caused by the fans of the second recirculation system 24. In particular, the cooling process in the aircraft cabin is slowed down considerably.

The air conditioning system 10 furthermore comprises an electronic control device 20 which is designed to control the first and the second recirculation systems 18, 24. The control device 28 evaluates a series of parameters which are provided to the control device 28 by various sensors and/or storage devices. In particular, the control device 28 can evaluate a cabin temperature actual value for the first aircraft cabin region 12a, a cabin temperature set value for the first aircraft cabin region 12a, a cabin temperature actual value for the second aircraft cabin region 12b, a cabin temperature set value for the second aircraft cabin region 12b, an outside temperature actual value, a temperature actual value of the air provided by the air conditioning unit 14, a temperature set value of the air provided by the air conditioning unit 14, a temperature actual value of the air provided by the central mixer 16, a temperature set value of the air provided by the central mixer 16, a temperature actual value of the air provided by the local mixers 20, 22 and/or a temperature set value of the air provided by the local mixers 20, 22.

In a first operating state (the normal operation) of the air conditioning system 10, the control device 28 controls the first recirculation system 18 in such a way that the first recirculation system 18 removes a predefined air volume flow from the first aircraft cabin region 12a. Similarly, the control device 28 controls the second recirculation system 24 in the first operating state of the air conditioning system 10 in such a way that the second recirculation system 24 removes a predefined air volume flow from the second aircraft cabin region 12b. If, in contrast, the control device 28 detects a second operating state, for example on the basis of the parameter evaluation which it has carried out, the presence of a defined operating situation of the air conditioning system 10, i.e. for example an operating situation in which rapid cooling of the aircraft cabin 12 is desired or required, the control device 28 checks, by evaluating the parameters available to it, whether the air conditioning unit 14 is already being fully utilized or is still able to provide additional cooling energy.

If the control device 28 ascertains in the second operating state, on the basis of the parameter evaluation which it has carried out, that the air conditioning unit 14 is not yet being operated at full load and can still provide additional cooling capacity, the control device 28 controls the second recirculation system 24 in such a way that the air volume flow removed from the second aircraft cabin region 12b by the second recirculation system 24 is reduced in relation to the predefined air volume flow removed from the second aircraft cabin region 12b by the second recirculation system 24 in the first operating state of the air conditioning system 10. For example, the air volume flow removed from the second aircraft cabin region 12b by the second recirculation system 24 can be reduced by 20% from the removal in the first operating state. The amount by which the air volume flow removed from the second aircraft cabin region 12b by the second recirculation system 24 is reduced in relation to the predefined air volume flow removed from the second aircraft cabin region 12b by the second recirculation system 24 in the first operating state of the air conditioning system 10 is controlled by the electronic control unit 28 likewise in dependence on the result of the parameter evaluation which it has carried out.

If the second recirculation system 24 is operated at reduced capacity, the first recirculation system 18 is, in contrast, controlled by the electronic control unit 28, again in dependence on the parameter evaluation which it has carried out, in such a way that the air volume flow removed from the first aircraft cabin region 12a by the first recirculation system 18 in the second operating state is increased in relation to the predefined air volume flow removed from the first aircraft cabin region 12a by the first recirculation system 18 in the first operating state of the air conditioning system 10 by an amount which is equal to the amount by which the air volume flow removed from the second aircraft cabin region 12b by the second recirculation system 24 is reduced in relation to the predefined air volume flow removed from the second aircraft cabin region 12b by the second recirculation system 24 in the first operating state of the air conditioning system 10. In other words, the control device 28 ensures a redistribution of the recirculation air conveying capacity between the first and the second recirculation system 18, 24.

As a result of the increased conveying capacity of the first recirculation system 18, the amount of waste heat produced by the fans of the first recirculation system 18 also increases. As already mentioned, the waste heat produced by the fans of the first recirculation system 18 can, however, be removed relatively easily, since the air heated by the waste heat can be mixed directly with cold fresh air in the central mixer 16.

Cooling capacity additionally provided by the air conditioning unit 14 can therefore be utilized very efficiently for removing this waste heat. As a result of the reduction of the capacity of the second recirculation system 24, however, the additional heat input, produced by the fans of the second recirculation system 24, into the recirculation air from the second aircraft cabin region 12b is markedly reduced. Thus, the air in the local mixers 20, 22 can also be cooled very much more quickly to a desired low temperature by mixing with premixed air from the central mixer 16. As a result, the time which is required to cool the aircraft cabin 12 to a desired temperature when the aircraft is on the ground can be significantly shortened.

The invention claimed is:

1. A system for air-conditioning an aircraft cabin, the system comprising:
   an air conditioning unit connected to a central mixer in order to supply the central mixer with air at a desired low temperature,
   a first recirculation system which is designed to remove exhaust air from a first aircraft cabin region and is connected to the central mixer in order to lead the exhaust air from the first aircraft cabin region into the central mixer,
   a second recirculation system which is designed to remove exhaust air from a second aircraft cabin region and is connected to a local mixer in order to lead the exhaust air from the second aircraft cabin region into the local mixer, the local mixer being connected to the central mixer in order to supply mixed air from the central mixer into the local mixer, and
   a programmable control device which is designed to control the first and the second recirculation systems in a first operating state of the air conditioning system in such a way that the first recirculation system removes a first predefined air volume flow from the first aircraft cabin region and the second recirculation system removes a second predefined air volume flow from the second aircraft cabin region,
   wherein the control device is also designed to control the first and the second recirculation systems in a second operating state of the air conditioning system in such a way that:
      an air volume flow removed from the second aircraft cabin region by the second recirculation system in the second operating state is reduced in relation to the second predefined air volume flow removed from the second aircraft cabin region by the second recirculation system in the first operating state of the air conditioning system, and
      the air volume flow removed from the second aircraft cabin region by the second recirculation system in the second operating state is also reduced in relation to an air volume flow removed from the first aircraft cabin region by the first recirculation system in the second operating state
   wherein in the second operating state, the second recirculation system is controlled to reduce air volume flow removed from the second aircraft region without completely stopping the operation of the second recirculation system.

2. The system according to claim 1, wherein the control device is designed to evaluate at least one predefined parameter and to control the second recirculation system in dependence on the evaluation of the at least one predefined parameter.

3. The system according to claim 1, wherein the control device is designed to evaluate a parameter including at least one of a cabin temperature actual value for the first aircraft cabin region, a cabin temperature set value for the first aircraft cabin region, a cabin temperature actual value for the second aircraft cabin region, a cabin temperature set value for the second aircraft cabin region, an outside temperature actual value, a temperature actual value of the air provided by the air conditioning unit, a temperature set value of the air provided by the air conditioning unit, a temperature actual value of the air provided by the central mixer, a temperature set value of the air provided by the central mixer, a temperature actual value of the air provided by the local mixer and a temperature set value of the air provided by the local mixer and is designed to control the second recirculation system in dependence on the evaluation of the parameter.

4. The system according to claim 1, wherein the control device is designed to control the first and the second recirculation systems such a way that:
   the air volume flow removed from the first aircraft cabin region by the first recirculation system in the second operating state is increased in relation to the first predefined air volume flow removed from the first aircraft cabin region by the first recirculation system in the first operating state of the air conditioning system, and
   the air volume flow removed from the first aircraft cabin region by the first recirculation system in the second operating state is also increased in relation to the air volume flow removed from the second aircraft cabin region by the second recirculation system in the second operating state.

5. The system according to claim 4, wherein the control device is designed to control the first and the second recirculation systems in such a way that the air volume flow removed from the first aircraft cabin region by the first recirculation system in the second operating state is increased in relation to the first predefined air volume flow removed from the first aircraft cabin region by the first recirculation system in the first operating state of the air conditioning system by an amount which is equal to an amount by which the air volume flow removed from the second aircraft cabin region by the second recirculation system in the second operating state is reduced in relation to the second predefined air volume flow removed from the second aircraft cabin region by the second recirculation system in the first operating state of the air conditioning system.

6. A method for air-conditioning an aircraft cabin, the method comprising:
   producing air at a desired low temperature by an air conditioning unit,
   supplying the air produced by the air conditioning unit into a central mixer,
   removing exhaust air from a first aircraft cabin region by a first recirculation system,
   leading the air removed from the first aircraft cabin region by the first recirculation system into the central mixer,
   removing exhaust air from a second aircraft cabin region by a second recirculation system,
   leading the air removed from the second aircraft cabin region by the second recirculation system into a local mixer,
   supplying mixed air from the central mixer into the local mixer,
   controlling the first and the second recirculation systems by a programmable control device in a first operating state of the air conditioning system in such a way that the first recirculation system removes a first predefined air volume flow from the first aircraft cabin region and the second recirculation system removes a second predefined air volume flow from the second aircraft cabin region, controlling the first and the second recirculation systems by the programmable control device in a second operating state of the air conditioning system in such a way that:

an air volume flow removed from the second aircraft cabin region by the second recirculation system in the second operating state is reduced in relation to the second predefined air volume flow removed from the second aircraft cabin region by the second recirculation system in the first operating state of the air conditioning system, and the air volume flow removed from the second aircraft region by the second recirculation system in the second operating state is also reduced in relation to an air volume flow removed from the first aircraft cabin region by the first recirculation system in the second operating state wherein in the second operating state, the second recirculation system is controlled to reduce air volume flow removed from the second aircraft region without completely stopping the operation of the second recirculation system.

7. The method according to claim 6, further comprising:
evaluating by the control device at least one predefined parameter and controlling the second recirculation system in dependence on the evaluation of the at least one predefined parameter.

8. The method according to claim 6, further comprising:
evaluating by the control device a parameter including at least one of a cabin temperature actual value for the first aircraft cabin region, a cabin temperature set value for the first aircraft cabin region, a cabin temperature actual value for the second aircraft cabin region, a cabin temperature set value for the second aircraft cabin region, an outside temperature actual value, a temperature actual value of the air provided by the air conditioning unit, a temperature set value of the air provided by the air conditioning unit, a temperature actual value of the air provided by the central mixer, a temperature set value of the air provided by the central mixer, a temperature actual value of the air provided by the local mixer and a temperature set value of the air provided by the local mixer and controlling the second recirculation system in dependence on the evaluation of the parameter.

9. The method according to claim 6, wherein the control device controls the first and the second recirculation systems in such a way that:

the air volume flow removed from the first aircraft cabin region by the first recirculation system in the second operating state is increased in relation to the first predefined air volume flow removed from the first aircraft cabin region by the first recirculation system in the first operating state of the air conditioning system, and the air volume flow removed from the first aircraft cabin region by the first recirculation system in the second operating state is also increased in relation to the air volume flow removed from the second aircraft cabin region by the second recirculation system in the second operating state.

10. The method according to claim 9, wherein the control device controls the first and the second recirculation systems in such a way that the air volume flow removed from the first aircraft cabin region by the first recirculation system in the second operating state is increased in relation to the first predefined air volume flow removed from the first aircraft cabin region by the first recirculation system in the first operating state of the air conditioning system by an amount which is equal to an amount by which the air volume flow removed from the second aircraft cabin region by the second recirculation system in the second operating state is reduced in relation to the second predefined air volume flow removed from the second aircraft cabin region by the second recirculation system in the first operating state of the air conditioning system.

* * * * *